United States Patent [19]

Maruyama et al.

[11] Patent Number: 4,849,829
[45] Date of Patent: Jul. 18, 1989

[54] IMAGE RECORDING APPARATUS

[75] Inventors: Hiroyuki Maruyama; Tadao Kishimoto; Toshifumi Isobe; Jun Yokobori, all of Tokyo, Japan

[73] Assignee: Konishiroku Photo Industry Co., Ltd., Tokyo, Japan

[21] Appl. No.: 82,434

[22] Filed: Aug. 6, 1987

[30] Foreign Application Priority Data

Aug. 8, 1986 [JP] Japan ................... 61-186170

[51] Int. Cl.$^4$ ............................................. H04N 1/04
[52] U.S. Cl. ..................... 358/451; 358/450
[58] Field of Search ............... 355/3 R, 7, 14 R, 46, 355/53, 54; 358/258, 287, 288

[56] References Cited

U.S. PATENT DOCUMENTS

| | | | |
|---|---|---|---|
| 4,423,439 | 12/1983 | Watanabe | 355/7 X |
| 4,570,187 | 2/1986 | Ono et al. | 358/287 |
| 4,636,869 | 1/1987 | Tomohisa et al. | 358/287 |
| 4,679,096 | 7/1987 | Nagashima | 358/287 |

Primary Examiner—Fred L. Braun
Attorney, Agent, or Firm—James E. Nilles

[57] ABSTRACT

An image recording apparatus wherein image information is developed by converting the image information into an optical signal and by writing the image information on a drum-shaped image retainer with the converted optical signal to provide latent images and by developing the latent images, which are then recorded. A first writing timing is set in a first writing direction with respect to the image retainer and a second writing timing is set in a second writing direction with respect to the image retainer and the number of rotations with respect to the image retainer is calculated in accordance with the settings of the writing timings. The image information is overwritten by a number of times corresponding to the number of rotations to provide a plurality of images which may be entirely or partially or not superposed on one another.

7 Claims, 17 Drawing Sheets

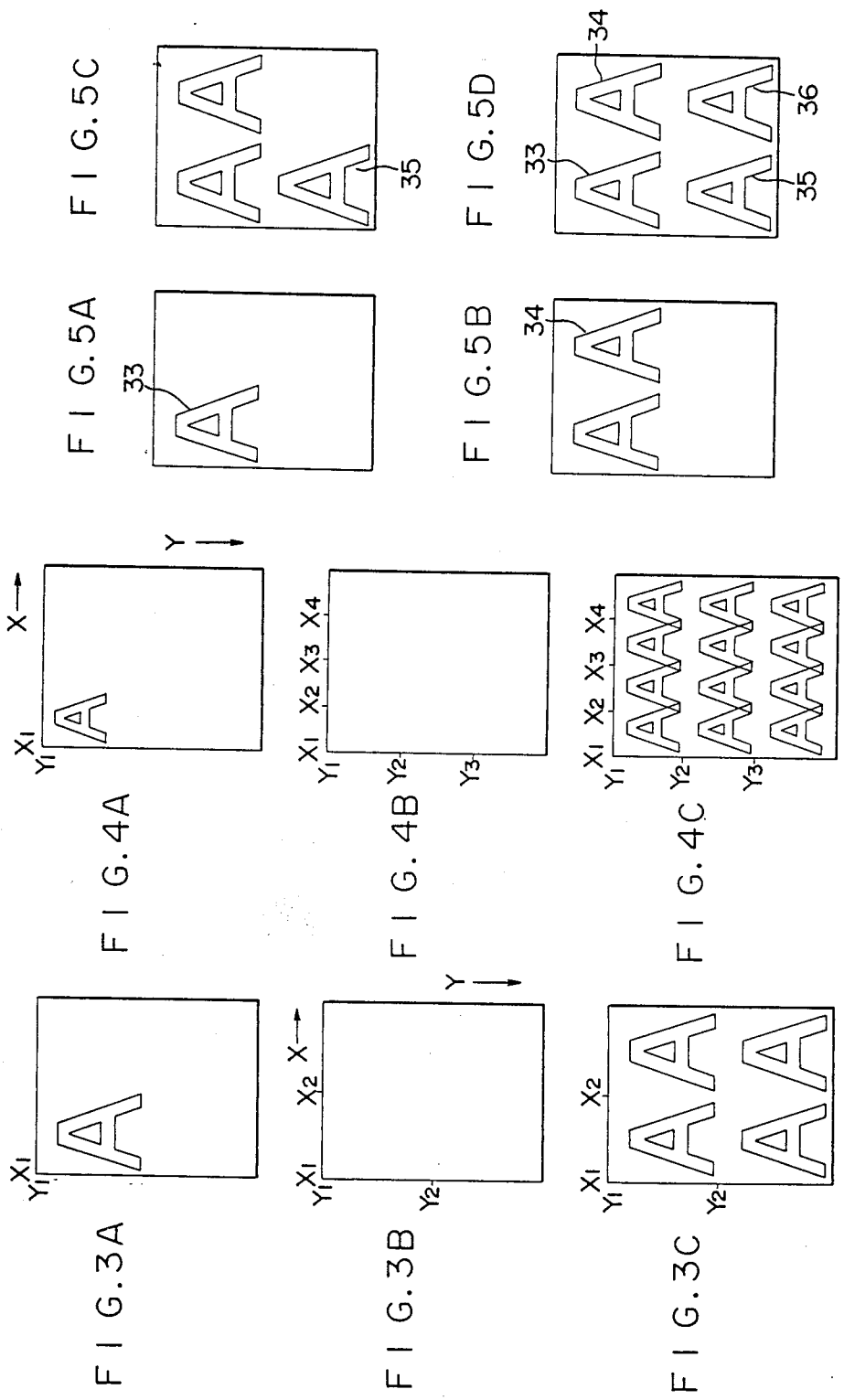

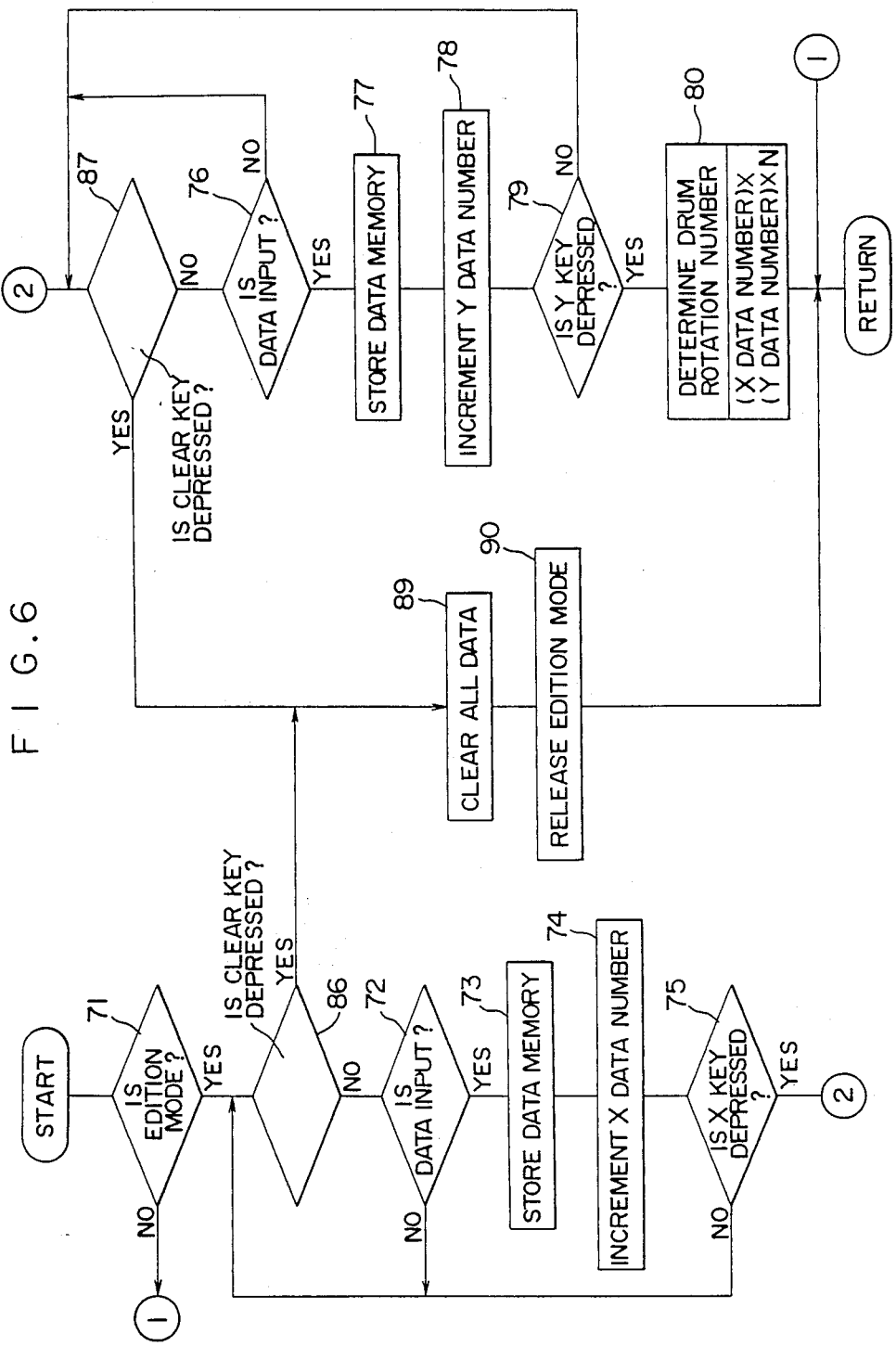

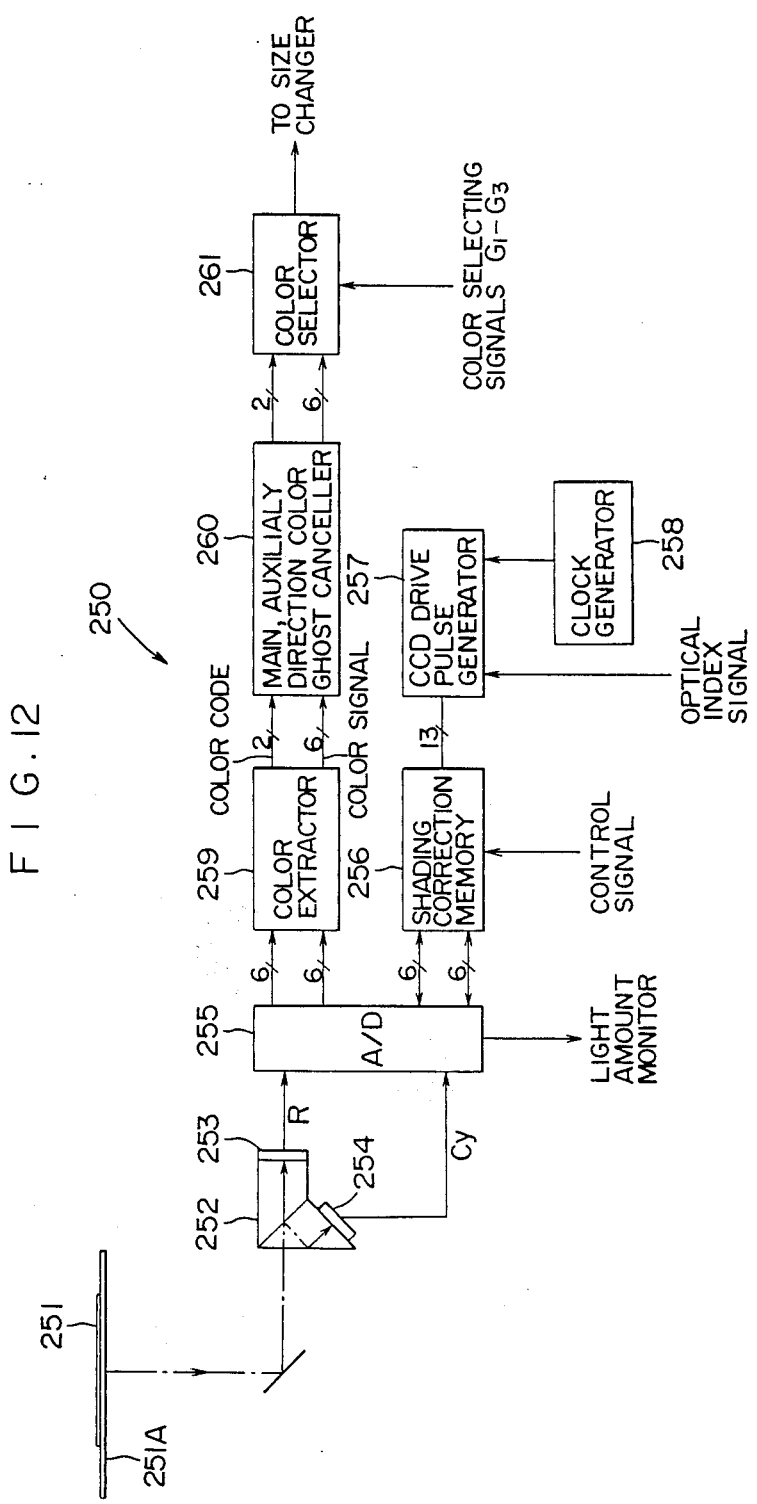

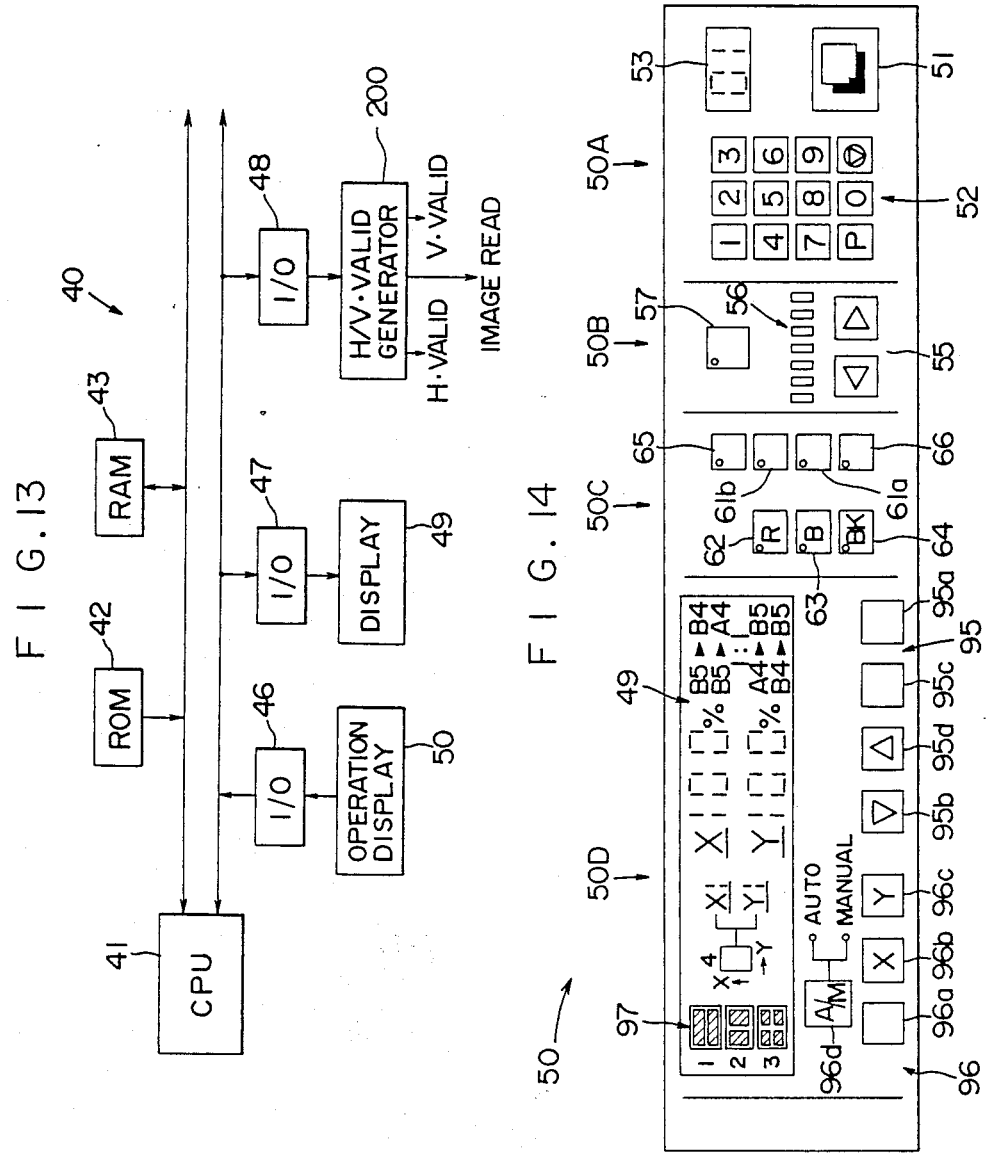

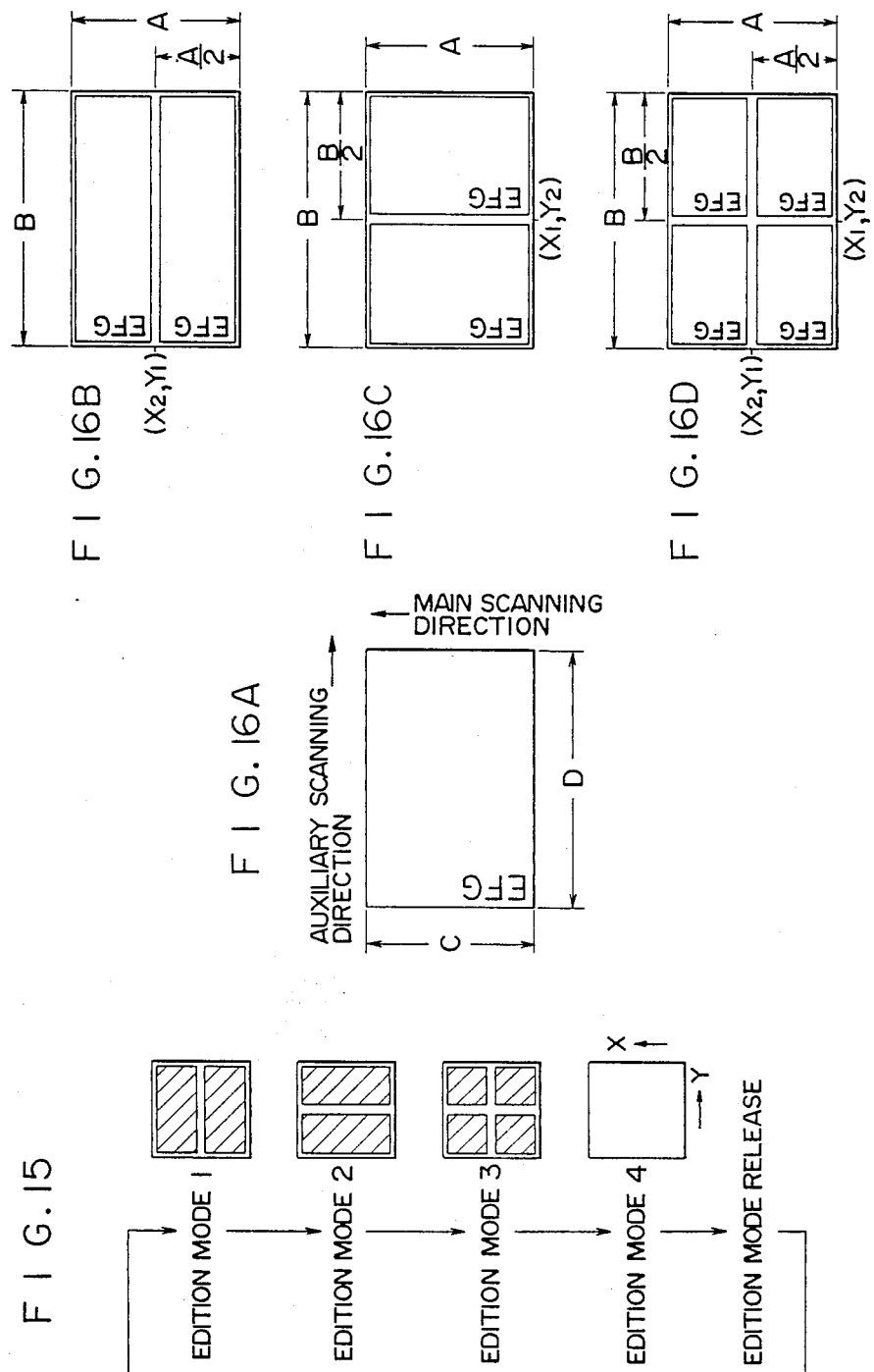

FIG. 17A
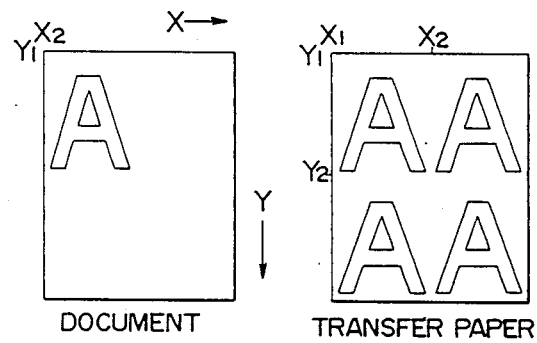
DOCUMENT
FIG. 17B
TRANSFER PAPER
FIG. 18A
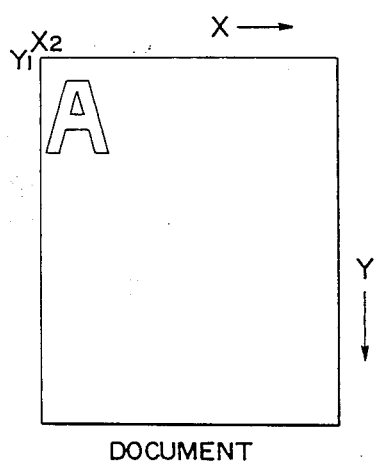
DOCUMENT
FIG. 17C
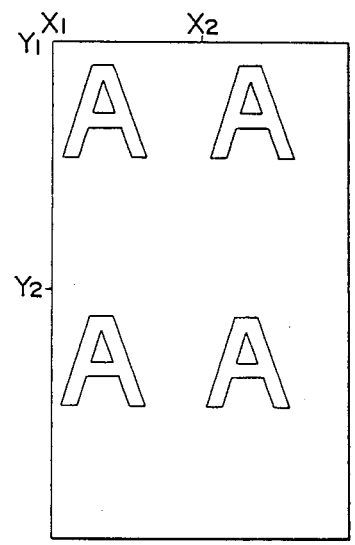
TRANSFER PAPER
(DOUBLE SIZE OF DOCUMENT)
FIG. 18B
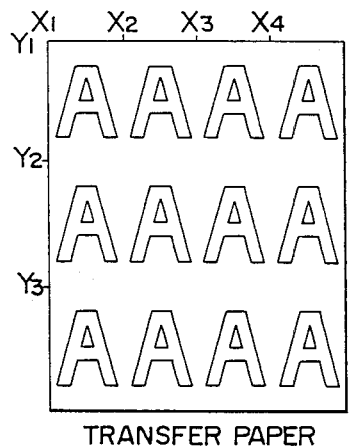
TRANSFER PAPER

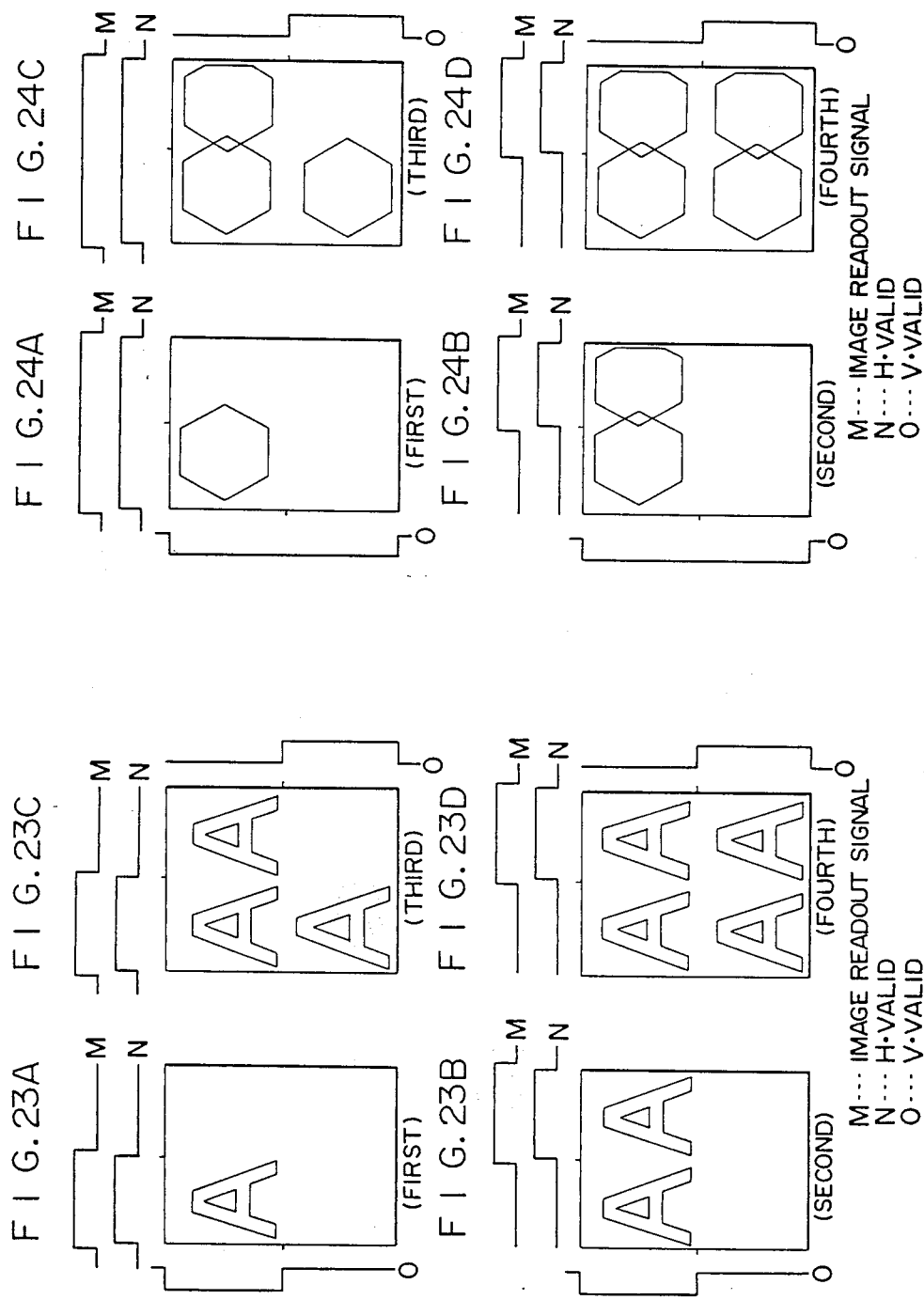

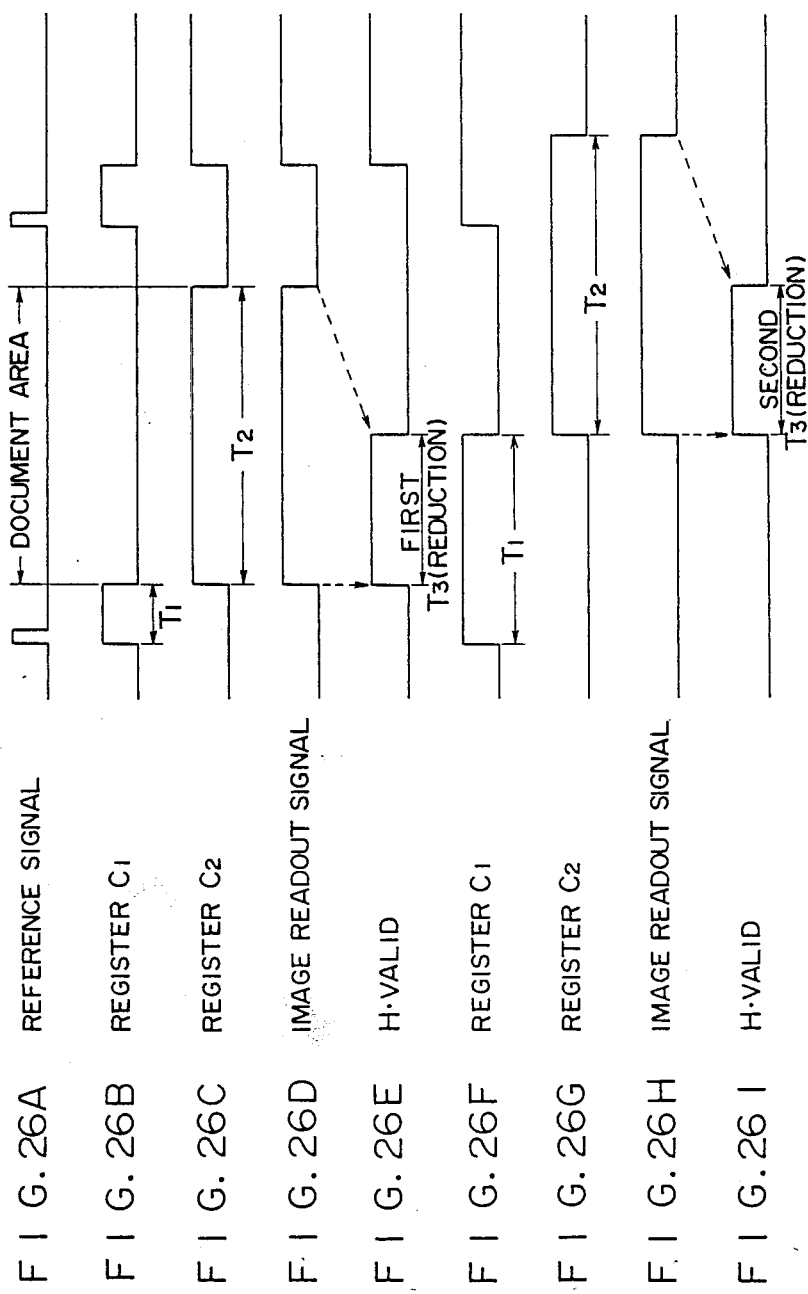

IMAGE RECORDING APPARATUS

BACKGROUND OF THE INVENTION

1. Field of the Invention

The present invention relates to an image recording apparatus having an editing function and suited for application to simplified electrophotographic color reproducing machine having a plurality of developing devices.

2. Description of the Prior Art

The simplified color reproducing machine records a color image by separating a color information into three or four kinds of color informations.

One example of such electrophotographic color reproducing machine is shown in FIG. 8. Incidentally, this example extracts and develops the color information into three colors.

In FIG. 8, reference numeral 10 denotes one example of the essential part of the color reproducing machine. Numeral 1 denotes a drum-shaped image retainer (e.g., a photosensitive drum, which will be shortly referred to as a "drum"), which has its surface covered with a photoconductive photosensitive surface layer such as selenium (Se) or an organic substance so that it can retain an electrostatic (latent) image corresponding to the optical image. Around the circumference of the drum 1, there are arranged the following members which are ordered in the rotating direction of the drum 1.

The surface of the drum 1 is evenly charged by a charging device 2. The surface thus charged is exposed to an image (whose ray is indicated at numeral 4) based on a color separate image.

After this image exposure, the image is developed by predetermined developing devices.

These developing devices are arranged in a number corresponding to that of the color separate images. In this example, more specifically, a developing device 5 charged with a developer of red toner, a developing device 6 charged with a developer of blue toner, and a developing device 7 charged with a developer of black toner are arranged to face the surface of the drum 1 sequentially in the recited order with respect to the rotating direction of the drum 1.

The developing devices 5 to 7 are sequentially selected in synchronism with the rotations of the drum 1. By selecting the developing device 7, for example, a color separate image of black, i.e., a normal dichroic image is developed.

At the side of the developing device 7, a pretransfer charging device 9 and a pre-transfer exposure lamp 11 are disposed so that a color image may be liable to be transferred to a recording (or transfer) paper P. However, these pre-transfer charging device 9 and exposure lamp 11 are provided, if necessary.

The color images thus developed to the drum 1 are transferred to the recording paper P by a transfer device 12.

The recording paper P having the color images transferred thereto is subjected to a fixing treatment by a fixing device 13 at a subsequent stage and is then discharged.

Incidentally, a charge eliminating device 14 is constructed of any combination of a charge eliminating lamp and a charge eliminating corona discharger.

A cleaning device 15 is constructed of a cleaning blade or a fur brush for cleaning off the residual toner which is still left on the drum surface even after the color images have been transferred from the drum 1.

The aforementioned charging device 2 may be exemplified by a scorotron corona discharger, because this discharger is so little influenced by the preceding charge that it can stably charge the drum 1.

The image exposure may be obtained by an optical scanning device such as a laser beam scanner.

In case this optical scanning device is used, a semiconductor laser may be used as the light source of the image recording apparatus. This is because the semiconductor laser is small-sized and inexpensive but can allow a clear color image to be recorded.

FIG. 9 shows an example of the developing device 5 to be used in the aforementioned operations.

Reference numeral 21 appearing in FIG. 9 denotes a housing in which is rotatably accommodated a cylindrical sleeve 22. This sleeve 22 is equipped with a magnetic roll 23 having eight N and S poles. With the outer circumference of the sleeve 22, there is brought into forced contact a layer regulating member 24 for regulating the layer of the developer stuck to the sleeve 22 to a predetermined thickness such as 10 to 500 microns.

First and second agitating members 25 and 26 are also accommodated in the housing 21. The developer D in its reservoir 29 is sufficiently agitated and mixed by the coactions of the first agitating member 25 rotating counter-clockwise and the second agitating member 26 rotating in the direction opposite to the first one 25 and in an overlapping manner. The developer D thus mixed is conveyed to stick to the surface of the sleeve 22 by the rotational conveying force which is generated by the sleeve 22 and the magnetic roll 23 rotating in the directions opposite to each other.

The electrostatic latent image formed on the image retainer 1 is developed in a non-contact state by the developer D stuck to that image retainer 1.

Incidentally, for the development, a developing bias signal is supplied from a power source 30 and applied to the sleeve 22. This developing bias signal is composed of: a DC component selected from the power source 30 at a potential substantially equal to that of the non-exposed portion of the image retainer 1; and an AC component superposed on the DC component. As a result, only the toner T in the developer D on the sleeve 22 migrates to the surface of the image retainer 1, which is selectively formed into a latent image, to effect the developing treatment.

Incidentally, reference numerals 27 and 28 denote a toner container and a toner supply roller, respectively. Numeral 31 denotes a developing area.

When the toner density becomes thin, the toner supply roller 28 is rotated to supply a predetermined amount of toner T to the developer reservoir 29.

Incidentally, in the image recording apparatus thus constructed, the copying operations have to be performed several times so that an image shown in FIG. 10B may be obtained as a copied one from an original image shown in FIG. 10A, for example.

Specifically, an image shown in FIG. 10C is formed on the basis of the original image of FIG. 10A and is copied into two sheets. These two copies are arranged in the longitudinal direction to form the image shown in FIG. 10B.

According to the copying means of the prior art, therefore, the image shown in FIG. 10B cannot be obtained before at least three copying operations have been performed.

Thus, since the image recording apparatus of the prior art has no editing function, the copying operations are very troublesome even in case the image bearing the original images overwritten, as shown in FIG. 10B, is to be formed. These troublesome copying operations have to be repeated to overwrite a number of similar images.

In addition, the image quality of FIG. 10B is degraded, because the overwritten image of FIG. 10B has to be formed after the image shown in FIG. 10C has been once formed from the original image of FIG. 10A.

Moreover, the apparatus of the prior art has none of the size-changing function to overwrite the enlarged or reduced images.

It is frequently experienced to intend to overwrite an original document in a reduced scale because the document is excessively large.

This intention has never been realized yet by the image recording apparatus in which the readout signal of the image information of the document is digitally processed so that it may be recorded on the recording paper.

SUMMARY OF THE INVENTION

An object of the present invention is to provide an image recording apparatus which can solve the aforementioned defects of the prior art with a simple structure and has an editing function capable of easily overwriting.

In order to solve these problems, according to the present invention, there is provided an image recording apparatus for developing and recording an image information by converting said image information into an optical signal and by writing said image information on a drum-shaped image retainer with said converted optical signal, which apparatus comprises:

first timing setting means for setting a writing timing in a first writing direction with respect to said image retainer;

second timing setting means for setting a writing timing in a second writing direction with respect to said image retainer; and calculating means for calculating the number of developing rotations with respect to said image retainer in accordance with the settings of said writing timings.

All of the first and second timing setting means and said calculating means are constructed of microcomputer control systems.

The first writing direction is set in the main (or horizontal) scanning direction of an image reader, whereas the second writing direction is set in the auxiliary (or vertical) scanning direction of the same.

Moreover, the image informations are overwritten by rotating the image retainer the number of times corresponding to the number of developing rotations.

In case, more specifically, the overwrite shown in FIG. 10B is to be executed, the image retainer is controlled to be rotated four times. As shown in FIG. 5, moreover, an image 33 in the same position as an original image is copied at a first rotation, and an image 34 is copied at the righthand side of the image at a second rotation.

An image 35 is copied at the lower side of the original image 33 at a third rotation, and an image 36 is copied at the righthand lower corner at a final fourth rotation. Thus, the image overwriting edition is ended.

In this case, the paper is discharged at the stage of the end of the final image recording.

Another object of the present invention is to provide an image recording apparatus which has a size-changing function capable of designating a recording magnification such as size enlargement or reduction and an editing function capable of overwriting.

In order to solve the aforementioned problems, according to the present invention, there is provided an image recording apparatus for developing and recording an image information by converting said image information into an optical signal and by writing said image information on a drum-shaped image retainer with said converted optical signal, which apparatus comprises:

first timing setting means for setting a writing timing in a first writing direction with respect to said image retainer;

second timing setting means for setting a writing timing in a second writing direction with respect to said image retainer; and calculating means for calculating the number of developing rotations with respect to said image retainer in accordance with the settings of said writing timings, wherein said first and second writing timings are automatically set in accordance with the designation of a magnification, and wherein said image information is overwritten at the designated magnification the number of times corresponding to said number of developing rotations.

All of the first and second timing setting means and the calculating means are constructed of microcomputer control systems. If a magnification other than an equal one is designated, a plurality of overwriting treatments are executed at a fixed or independent magnification by selecting a plurality of edition modes prepared.

An example for adopting four kinds of edition modes is shown in FIG. 15. Although edition modes 1 to 3 are at fixed magnifications, an edition mode 4 can select an automatic setting mode, in which the magnification is automatically set by designating the number of overwrites, and a manual setting mode in which the magnification can be manually set.

In this case, the designation of the number of overwrites is arbitrary.

Other objects and features of the present invention will be made apparent from the following description taken with reference to the accompanying drawings.

BRIEF DESCRIPTION OF THE DRAWINGS

FIGS. 3A to 3C, FIGS. 4A to 4C and FIGS. 5A to 5D are diagrams showing overwritten images for explaining the operations of the present invention;

FIG. 6 is a flow chart showing one example of a control program for an edition mode;

FIGS. 11 and 13 are block diagrams showing control systems of the essential portions of a color image reproducing apparatus according to another embodiment of the present invention;

FIG. 12 is a block diagram schematically showing the image reader;

FIG. 14 is a top plan showing one example of the operation display;

FIG. 15 is a circulation diagram of edition modes;

FIGS. 16A to 16D, FIGS. 17A to 17C and FIGS. 18A and 18B are diagrams for explaining the edition modes;

FIGS. 23A to 23D and FIGS. 24A to 24D are diagrams for explaining the overwrite processings;

FIGS. 26A to 26I are waveform charts for explaining the operations of the generator.

DESCRIPTION OF THE PREFERRED EMBODIMENTS

One embodiment of the image recording apparatus having an editing function in accordance with the present invention will be described in detail in the following with reference to FIGS. 1 and so on.

In the present invention, the editing operations are accomplished by using a microcomputer which is used in a system control for controlling the operating state of a color reproducing machine.

Figure 1:
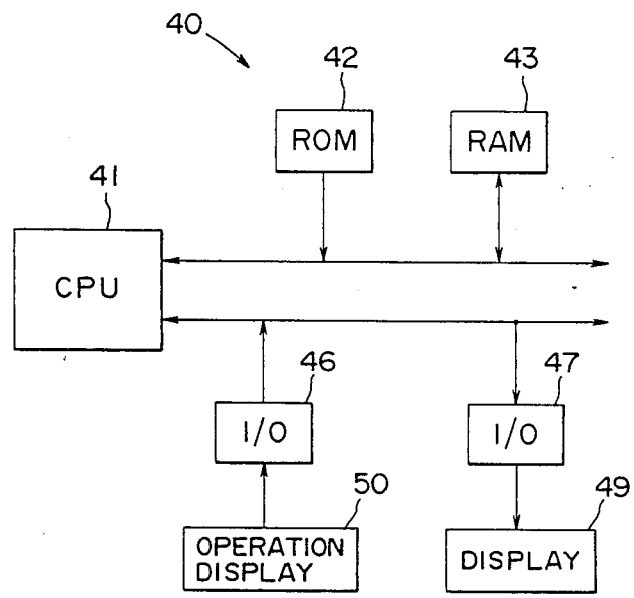
FIG. 1 is a block diagram showing a control system exemplifying the essential portion of a color image recording apparatus according to the present invention.

FIG. 1 shows one example of the essential portion of a microcomputer control system 40, in which reference numerals 41, 42 and 43 denote a microprocessor (i.e., CPU), a ROM for storing a control program, and a RAM for storing a variety of control data.

Figure 2:
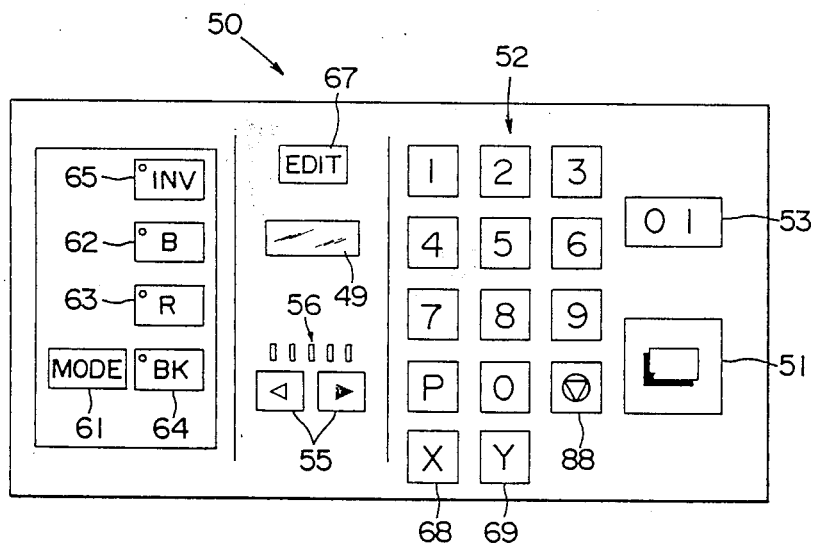
FIG. 2 is a top plan view showing one example of an operation display.

Instruction data from a variety of keys disposed in an operation display 50 shown in FIG. 2 are introduced into the CPU 41 via an I/O port 46 so that a predetermined arithmetic operation and so on are executed.

In an edition mode for an overwrite recording or the like, data for designating a timing for the overwrite are inputted from the operation display 50.

These data are write timing designating data in a first writing direction and in a second writing directions. If the first writing direction is in a main scanning (i.e., X) direction of an image reader, the second writing direction is an auxiliary scanning (i.e., Y) direction.

In response to the input of those write data, an instruction signal from the CUP 41 is fed via an I/O port 47 to a display 49 so that editing procedures for the overwrite or input data are displayed.

FIG. 2 shows one example of the key arrangement of the operation display 50.

Reference numeral 51 denotes a copy start button which causes a number of sheets set by a ten-key 52 to be copied, when depressed, and the set number to be displayed in a display 53.

The density of the copies can be made arbitrary by operating a copy density selecting button 55. The copy density selected is displayed in a display 56.

Numeral 61 denotes a copy mode switching button for alternately selecting a multi-color mode and a mono-color mode when it is depressed. When the mono-color mode is selected, an arbitrary color can be selected by means of three color selecting buttons 62 to 64.

If the color selecting buttons 62 to 64 are operated with a color erasure key 65 being operated when in the multi-color mode selected, the designation of the color operated is cancelled.

Numeral 67 denotes an edition button which is used for overwrite recording edition. For this edition, the edition button 67 is used together with X and Y coordinate designating buttons 68 and 69 which are located at the side of the ten-key 52. As a result, those buttons 68 and 69 function as timing setting input means.

Incidentally, when in this editing operation, the editing procedures may be displayed in the display 49.

FIGS. 3A to 3C show an example of the overwrite edition. In case an original image of FIG. 3A is to be overwritten into four images, as shown in FIG. 3C, X and Y coordinates (X1, X2, Y1, Y2) corresponding to the positions, in which the original image is to be overwritten, as shown in FIG. 3B, are inputted.

FIGS. 4A to 4C show one example in case the original image is to be overwritten in more positions. For example, twelve images are to be overwritten in the X and Y directions.

In this case, too, the individual data of X and Y coordinates (X1, X2, X3, X4, Y1, Y2, Y3, Y4) corresponding to the overwriting positions, as shown in FIG. 3B, are inputted.

Incidentally, in the editing operations for the overwrite, the writing timing for the image retainer 1 is changed in accordance with the aforementioned individual data for write position designations, and the number of developing rotations of the image retainer 1 is calculated. As this rotation number calculating means, the arithmetic operation function of the aforementioned CPU 41 is utilized.

FIG. 6 is a flow chart showing one example of the an overwrite recording control program.

First of all, at a step 71, it is judged whether or not the edition mode selecting button is depressed. If YES, whether or not the data input exists is checked. If YES, the data (in two figures, for example) are sequentially stored (at steps 72 and 73). The first data input is in the X coordinate. In the example of FIGS. 3A to 3C, the individual data X1 and X2 are inputted.

Upon each data input, the X data number is incremented at a step 74. It is then judged at a step 75 whether the X button (or key) 68 disposed in the operation display 50 has been operated. Until the X button 68 is operated, all the input data are handled as the data in the X coordinate.

If the X button 68 is depressed, the procedures shift to the input step of Y-coordinate data. Like the input judgement of the X-coordinate data, more specifically, the data (in two figures like the aforementioned ones) are sequentially stored, upon each their input, (at steps 76 and 77) in the memory 43. In the example of FIGS. 3A to 3C, the individual data Y1 and Y2 are inputted.

Upon each data input, the Y data number is incremented (at a step 78). After this, it is judged at a step 79 whether or not the Y button (or key) 69 disposed in the operation display 50 has been operated. Until this button 69 is operated, all the input data are handled as the Y-coordinate data.

Here, in case a clear button 88 shown in FIG. 2 is depressed in the X-coordinate input state or Y-coordinate input state, this depression is judged at steps 86 and 87 so that the aforementioned all data are cleared at a step 89.

After these data clearances, the edition mode is released (at a step 90), and the procedures are returned to the main processing routine.

If the Y button 69 is operated, the number of rotations required for developing the image retainer 1 is calculated at a subsequent step 80. Specifically, since the number of rotations required for developing the image retainer 1 is calculated by:

(X data number)×(Y data number)×(N number of color), this arithmetic operation is performed on the basis of the aforementioned input data.

The rotation number data resulting from the calculation are fed to a (not-shown) drive control circuit of the image retainer 1 to make the controls for the edition operations.

In the monocolor overwrite copy of FIG. 3C, for example, the number of rotations is 4 because both the X and Y data numbers are 2. As a result, an original image is subjected at a first rotation to an exposure and a development (as shown in FIG. 5A) in the same position as that of itself and is shifted by X2 in the X direction by a second rotation so that it may be subjected to an exposure and a development (as shown in FIG. 5B). Likewise, by third and fourth exposures and developments, images shown in FIGS. 5C and 5D are obtained. The final image is subjected to an exposure and a development until it is fixed.

In the overwrite case shown in FIGS. 4A to 4C, the number of rotations is selected at 12, and the fixing treatment is performed at the twelfth rotation so that the final image shown in FIG. 4C is recorded. In two color copy case shown in FIG. 3C, N is 2 so that the number of rotations is 8.

Incidentally, one example of the aforementioned mode switching, i.e., the copy mode switching between the multi-color and mono-color modes will be described in the following, although not related directly to the present invention.

Figure 7:
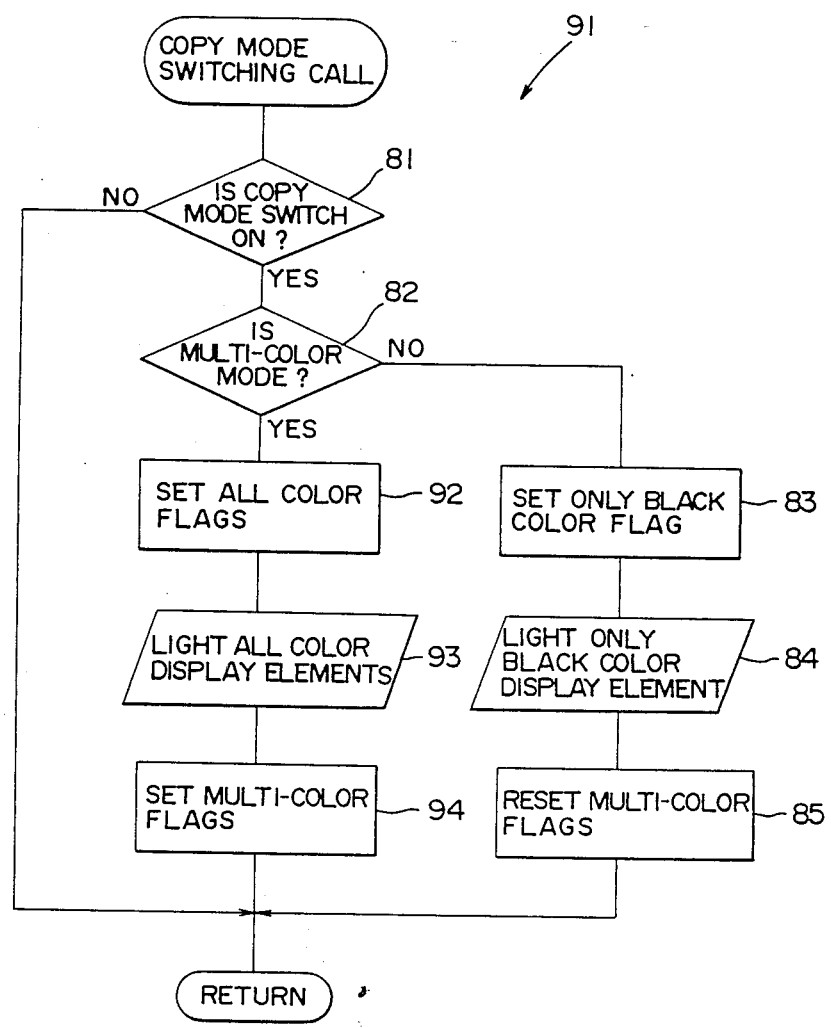
FIG. 7 is a flow chart showing one example of a control program for switching copy modes.
Figure 8:
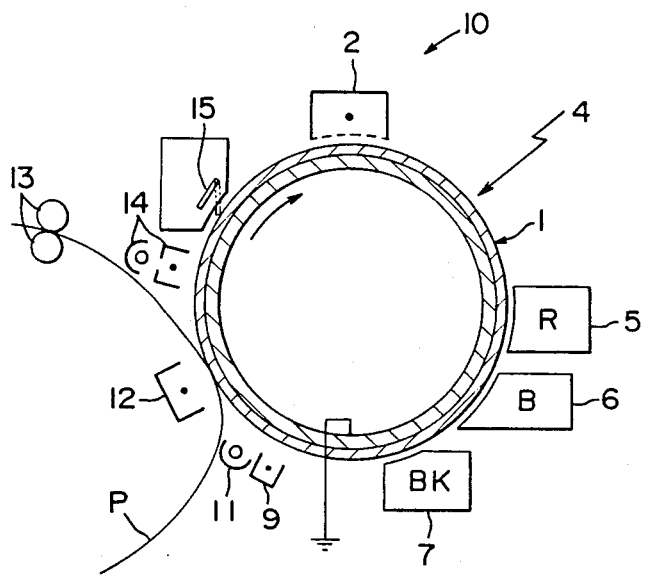
FIG. 8 is a diagram showing one example of a color reproducing machine.
Figure 10A:
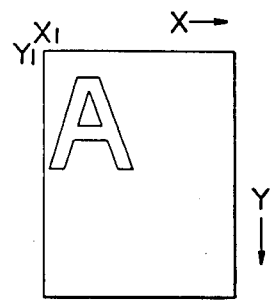
FIGS. 10A to 10O are diagrams used for explaining the overwriting operations of the prior art.
Figure 10B:
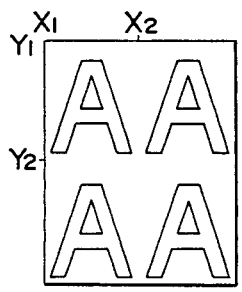
Figure 9:
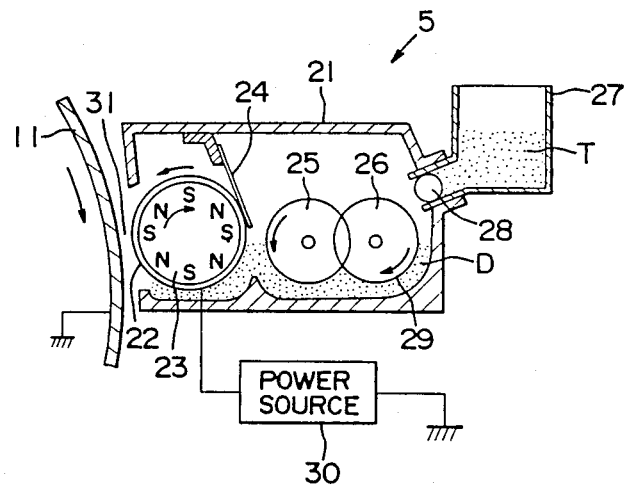
FIG. 9 is a section showing the essential portion of one example of a developing device to be used in the color reproducing machine.
Figure 10C:
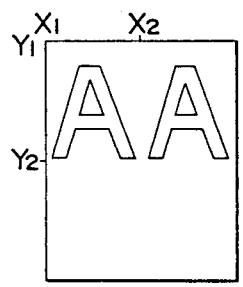

If the copy mode switching button 61 is operated, a processing routine 91 for switching the copy mode shown in FIG. 7 is called.

If the copy mode switching button 61 is operated, more specifically, this switching is judged at a step 81, and the state of the color copy mode is subsequently judged (at a step 82). Since, in this color copy mode, the multi-color mode and the mono-color mode are switched by the mode switching button 61, it is checked at this step which color copy mode the mode before the operation of the button 61 belongs to.

This mode judgement is performed depending upon whether or not the multi-color mode flag is present. If the multi-color mode flag is at 1, the preceding color copy mode is the multi-color one. In this case, therefore, it is necessary to invert the color copy mode into the mono-color mode.

If the multi-color mode flag is at 0, on the contrary, the preceding color copy mode is the mono-color one. In this case, therefore, the color copy mode is inverted into the multi-color mode.

Thus, if the mode flag is at 1, only the black color flag is set (at a step 83) in this example so as to effect the inversion into the mono-color mode.

In the mono-color mode, more specifically, the black color flag is set at 1 so that the mode may unconditionally be a black one, i.e., a normal mono-color copy mode. After this, a display element (although not shown) such as an LED disposed in the black color selecting button 64 is controlled (at a step 84) into a lit state. This makes it possible to visually recognize that the black color is selected at present in the mono-color mode.

After the black color display element has been controlled to the lit state, the mode flag is reset (at a step 85). This is because, if the copy mode switching button 61 is operated when in a subsequent mode selecting operation, the multi-color mode can be instantly selected in place of the mono-color copy mode selected just before.

If it is confirmed at the step 82, on the other hand, that the multi-color mode flag is at 0, the flags of all the colors from red to black colors are set, and the color selecting buttons 62 to 64 are controlled to lit states. After this, the multi-color mode flag is set (at steps 92 to 94) so that the procedures are returned from the copy mode switching control routine to the main control routine.

Incidentally, since the description thus far made is directed to the simplified reproducing machine, for example, only the three red, blue and black colors can be selected as the copyable colors even in the multi-color mode. It is, however, easily understandable that the present invention can be applied to not only a color reproducing machine capable of copying other colors but also a color image recording apparatus capable of developing treatment on the basis of a color separate image (e.g., a color separate image of complementary colors) different from that of the present embodiment.

Figure 11:
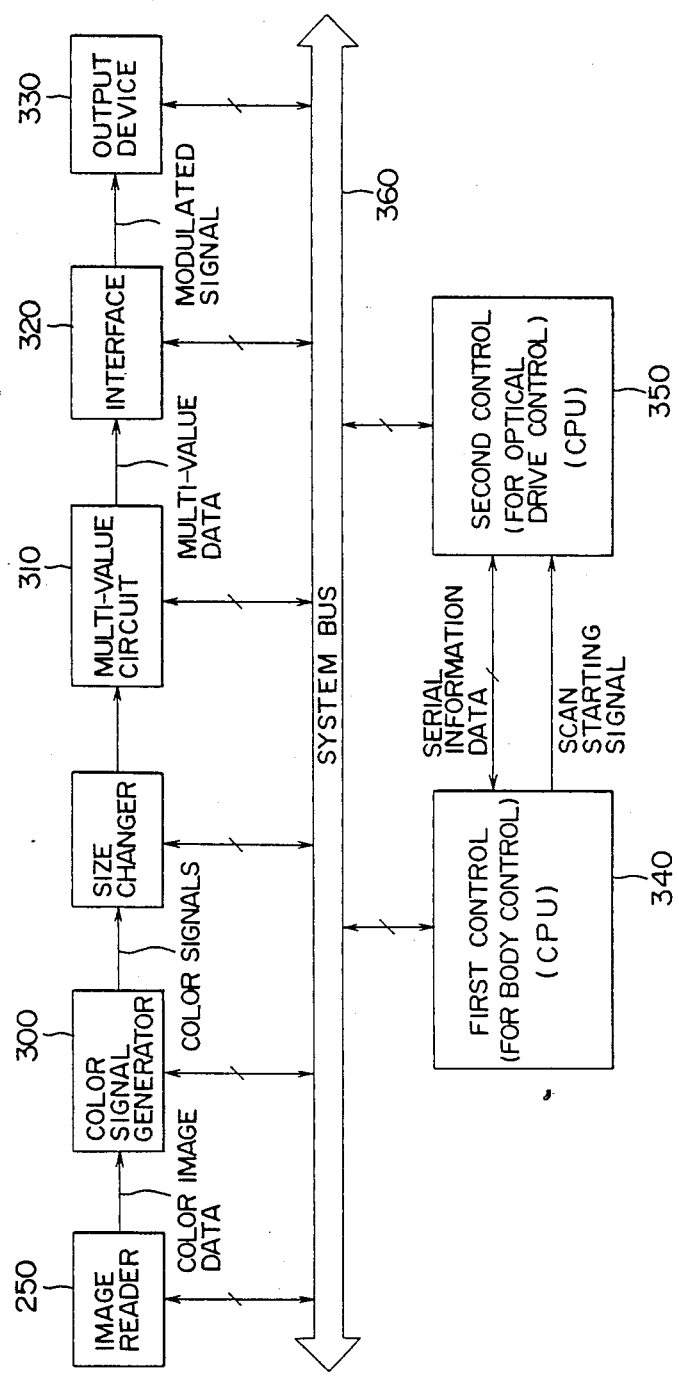

FIG. 11 schematically shows a system for use in a color image reproducing apparatus according to another embodiment of the present invention.

The color image informations of an original document are converted into color image signals by an image reader 250 and are subjected to an image processing such as an A/D conversion so that they are converted into image data of a predetermined bit number such as image data of sixteen gradations (O to F).

The image data are extracted into a plurality of color signals at a color signal generator 300. The present embodiment will be described in case three color signals of red, blue and black colors are used as the plural color signals. It will be easily understood that the image data can be extracted into other color signals.

The color signals thus extracted are fed to a size changer. By this size changer, the magnification can be changed (in the main scanning direction) arbitrarily to 20 to 40%, for example. The signals thus size changed are fed to a multi-value circuit 310 so that they are sequentially multi-valued. In the present embodiment, the signals are converted into penta-value dithers by the use of a dither matrix having a predetermined threshold value.

The dither image is fed through an interface circuit 320 to an output device 330. The interface circuit 320 is used to control the output state of the dither image and the sendout of a test pattern.

The output device 330 can be exemplified by a laser recorder. In this case, the dither image is converted into predetermined optical signals, which are modulated on the basis of its multi-value data. As a result, the signal modulation in this example is an internal one but may be an external one.

With the optical signals obtained from the output device 330, electrostatic latent images are formed for the individual colors and are developed and then fixed to record a desired color image on the recording paper.

The aforementioned procedures from the image reader 250 to the output device 330 are processed in accordance with a predetermined algorithm on the basis of instruction signals sent out from two controls 340 and 350. Therefore, these two controls are constructed of microcomputers.

The first control 340 controls the image processor unit, whereas the second control 350 controls mainly the peripheral devices provided for reading the image.

Therefore, the first and second controls 340 and 350 execute the controls of not only the sendout of the aforementioned various instruction signals but also the various hardwares and the color reproducing machine accompanying the output device 330 for the image read-out in accordance with a predetermined sequence.

Incidentally, reference numeral 360 denotes a system bus through which those various instruction signals are given and taken.

The aforementioned image reader 250 can be exemplified by that having the structure shown in FIG. 12.

In FIG. 12, the color image informations (or optical image) of an original document 251 placed on a table 251A are separated into two color separate images by a dichroic mirror 252.

In this embodiment, the two color separate images are those of a red color R and a cyan color Cy. For this extraction, the dichroic mirror 252 has a cutoff of about 600 nm. As a result, the red component is a transmissive ray whereas the cyan component is a reflective ray.

The individual color separate images of the red and cyan colors R and Cy are fed to image readers 253 and 254 such as CCDs, respectively, from which the image signals of only the red component R and the cyan component Cy are outputted.

These image signals R and Cy are fed through a normalizing amplifier (although not shown) to an A/D converter 255 so that they are converted into digital signals of predetermined bit numbers, respectively.

Upon these A/D conversions, shading corrections are performed. For this performance, a shading correcting memory 256 is prepared for extracting and storing one line of white image data from the outside of the image readout area to use it as shading correcting data.

For these operations, the memory 256 is read out in synchronism with the clock of a CCD drive pulse generator 257. This generator 257 is equipped with a clock generator 258. The timing of the memory 256 is regulated by a scan starting index signal fed to the pulse generator 257 and the control signal from the second control 350.

The digital color image signals are fed to a color extractor 259 at a next stage so that they are extracted into a plurality of color signals necessary for the color image recording.

In the example described above, the recording apparatus is simplified to record the color images in the three colors of red R, blue B and black BK colors. As a result, the color image signals are extracted into those three color signals R, B and BK.

These color signals R, B and BK are fed to a ghost canceller 260 in which the ghost eliminations are executed to cancel the ghost signals generated in the main and auxiliary scanning directions.

Here, the main scanning direction with respect to the document 1 is oriented in the line (i.e., horizontal scanning) direction of the image readers 253 and 254, whereas the auxiliary scanning direction is oriented in the moving (i.e., vertical scanning) direction of the image readers 253 and 254.

The color signals R, B and BK after the ghost eliminations are fed to a color selector 261 so that one color signal is selected for one rotation of the image retainer 1.

This is because there is adopted an image forming process for developing a color image of one color for each rotation of the image retainer 1, as has been described above. In synchronism with the rotations of the image retainer 1, the developing devices 5 to 7 are sequentially selected, and the color signals corresponding to the developing devices selected are sequentially selected in the color selector 261.

Selection signals G1 to G3 for the color signals are sent out from the second control (or microcomputer) 350.

FIG. 13 shows one example of the control system 40 so as to explain the controls stressing the operation display 50 and a valid area signal generator 200.

In FIG. 13: reference numeral 350 denotes the aforementioned microprocessor (CPU); numeral 42 a ROM for storing the control program; and numeral 43 a RAM for storing the various control data.

The instruction data from the various keys disposed in the operation display 50 shown in FIG. 14 are latched via the I/O port 46 into the CPU 41 so that predetermined arithmetic operations are executed.

From the operation display 50, there are inputted write timing designating data for the edition mode such as the overwrite (or continuous copying) recording.

The write data are write timing designating data in the first writing direction and in the second writing direction.

If the first writing (or continuous copying, which will be similar in the following) direction is oriented in the main scanning (i.e., X) direction of the image reader, the second writing direction is oriented in the auxiliary scanning (i.e., Y) direction.

In response to the input of those write data, the instruction signal from the CPU 41 is fed via the I/O port 47 to the display 49 so that the designated magnification and the selected edition mode are displayed.

When in the edition mode such as the overwrite mode, it is necessary to record the image informations of the document in the designated positions on the recording paper. This makes it necessary to have signals for determining the read starting timing of the image informations of the document and the laser writing timing of the image retainer.

As these signals, there are required in addition to the image read signals laser writing horizontal and vertical valid area signals H-VALID and V-VALID.

Of these signals, the image read signal may have only its start timing controlled, as will be described hereinafter. However, the valid area signals are generated on the basis of the instruction signals from the CPU 41 because they are different in not only the generation timing but also the signal width in dependence upon the edition mode.

As a result, the instruction signals from the CPU 41 are fed via an I/O port 48 to the valid area signal generator 200.

FIG. 14 shows one example of the key arrangement of the operation display 50.

FIG. 14 extracts only the four displays of the actual key arrangement. Reference numerals 50A, 50B, 50C and 50D denote a ten-key control portion, a recording density control portion, a color mode control portion and a size-change and edition control portion, respectively.

According to the present embodiment, in the ten-key control portion 50A, the automatic and manual density settings can be selected by means of a selection key 57. Only in the manual selection, the control of the density selection key 55 is valid.

Numerals 61a and 61b denote copy mode switching keys for selecting the multi-color mode and the monocolor mode, respectively.

Numeral 66 denotes a partial color switching key, which can record only the area surrounded by a marker written in the document with the color of the marker when it is controlled.

The size-change and edition control portion 50D is further composed of a size change control portion 95 and an edition control portion 96.

The size change control portion 95 designates the recording magnification. Numeral 95a designates a fixed magnification selection key, which rotates the magnification designation, when it is controlled, with the relation of a symbol mark displayed in the right-hand upper corner of the display 49.

In the case of an independent size change, if a coordinate selection key 95b and subsequently zoom keys 95c and 95d are controlled, the magnification can be designated at a pitch of 1%. The designated magnification is displayed by % on the display 49.

The coordinate selection key 95b is constructed to have its designation mode circulated so that it may designate the X coordinate at its first depression, the Y coordinate at its second depression and the X and Y coordinates simultaneously at its third depression. The edition mode is designated by the keys on the control portion 96.

Numeral 96a denotes an edition mode selection key which can be controlled to designate four kinds of edition modes in this example.

The edition modes are displayed in their symbol marks in FIG. 15. The edition mode 1 is one in which two identical images are overwritten with the transverse direction being compressed to ½.

In the edition mode 2, two identical images are overwritten with the longitudinal direction being compressed to ½. In the edition mode 3, four identical images are overwritten with the longitudinal are transverse directions being compressed to ½.

In these edition modes 1 to 3, the magnifications can be automatically calculated from the sizes of the document and the recording paper. This means the magnification is fixed, as will be described later in more detail.

The final edition mode 4 is another edition mode, in which the number of overwrites can be arbitrarily set. As a result, the number of overwrites in the transverse (i.e., X) direction is selected by a selection key 96b, and the number of overwrites in the longitudinal (i.e., Y) direction is selected by a selection key 96c.

In this edition mode 4, the magnification can be automatically set if an automatic size change selection key 96d is controlled. In accordance with the number of write designating sheets, more specifically, the magnification capable of recording the recording paper P is automatically calculated and recorded from the sizes of the document and the recording paper P.

As a result, all the image informations of the document can be overwritten without any deficiency.

If the selection key 96d is released, the longitudinal and transverse magnifications can be set independently of each other. At this time, the magnification is set by using the selection keys 96b and 96c and the ten-key 52.

What edition mode is selected can be confirmed in view of the lighting of the symbol mark 97 of the display 49.

Each time the selection key 96a is depressed, the edition modes are rotated. FIGS. 16A to 16D show examples of the overwrite editions.

FIGS. 16A to 16D correspond to the examples of the edition modes 1 to 3 with the magnification being fixed. It is assumed that the recording paper (or ordinary transfer paper) has a size of A×B although the document shown in FIG. 16A has a size of C×D.

Since, in the case of the edition mode 1, the transverse direction is reduced to ½ for the recording, the magnifications in the transverse and longitudinal directions are automatically set, as follows:

$$\text{Transverse Magnification} = \left(\frac{A\&6}{2}\right) \cdot (1/C)$$
$$= A/(2C);$$

and $$\text{Longitudinal Magnification} = B/D.$$

and
Longitudinal Magnification =B/D. In this overwrite case, moreover, the exposure and development are accomplished in the number of the overwrites, as has been described hereinbefore, and the transfer and fixing are then accomplished to overwrite the document images on a sheet of recording paper. As a result, the number of drum rotations is different depending upon the edition mode. The write timing and the rotation number are set by setting the edition mode, as follows:

In the edition mode 1, the numbers (which are conveniently denoted at X and Y, as will be in the following) of the overwrites in the transverse and longitudinal directions are as follows:

$$X=2; \text{ and } Y=1.$$

Therefore, the drum rotation number (which is required for each sheet of copy paper) is automatically set, as follows:

$$\text{Drum Rotation Number}=(X\cdot Y)\ N=2N,$$

wherein N denotes the number (i.e., three at the maximum) of the overwritten colors. The write starting point of the second overwrite is located at (A/2, 0).

In the edition mode 2, the transverse direction is changed to the longitudinal direction.

In the edition mode 3, the modes 1 and 2 are synthesized. As a result, the individual variables are automatically set as follows:

| | |
|---|---|
| Transverse Magnification | $= (A/2) \cdot (1/C)$ |
| | $= A/(2C);$ |
| Longitudinal Magnification | $= (B/2) \cdot (1/D)$ |
| | $= B/(2D);$ |
| Drum Rotation Number | $= (X \cdot Y)\ N = 4N;$ |
| 2nd Write Starting Point | $= (A/2, 0);$ |
| 3rd Write Starting Point | $= (0, B/2);$ | and

| | |
|---|---|
| 4th Write Starting Point | $= (A/2, B/2).$ |

The image writing order in the edition mode 4 is shown in FIGS. 5A to 5D.

FIGS. 17A to 17C show an overwrite example of the edition mode 4, in which the automatic setting mode is selected for the magnification in the case of X=2 and Y=2.

The record is shown in FIG. 17B if the recording paper has the same size as that of the document, and the record is shown in FIG. 17C if the recording paper used has a double size of the document.

The record is shown in FIG. 18B if X=4 and Y=3 are designated in the manual setting mode.

Here, in the manual setting mode, as shown in FIG. 18B, the divided coordinate points (X1 to X4) and (Y1 to Y4) in the transverse and longitudinal directions, i.e., the write starting points are automatically calculated from the overwrite designating numbers X and Y. In this case, however, the recording magnification is not calculated. As a result, the recorded images may partially overlapped, as shown in FIG. 18B if the document is excessively large.

In the automatic setting mode, the magnification is automatically calculated from the sizes of the document and the recording paper and the relations of the overwrite designating sheet numbers so that the record is not partially overlapped, as shown in FIG. 18B.

Examples of the various control programs in the image recording apparatus according to the present invention will be described in the following.

A series of the aforementioned color image, size change and edition processings are all controlled by the first and second microcomputers 340 and 350 which have been described with reference to FIG. 11.

Then, a control program for executing these processings will be described in detail with reference to FIG. 19 and so on.

Figure 19:
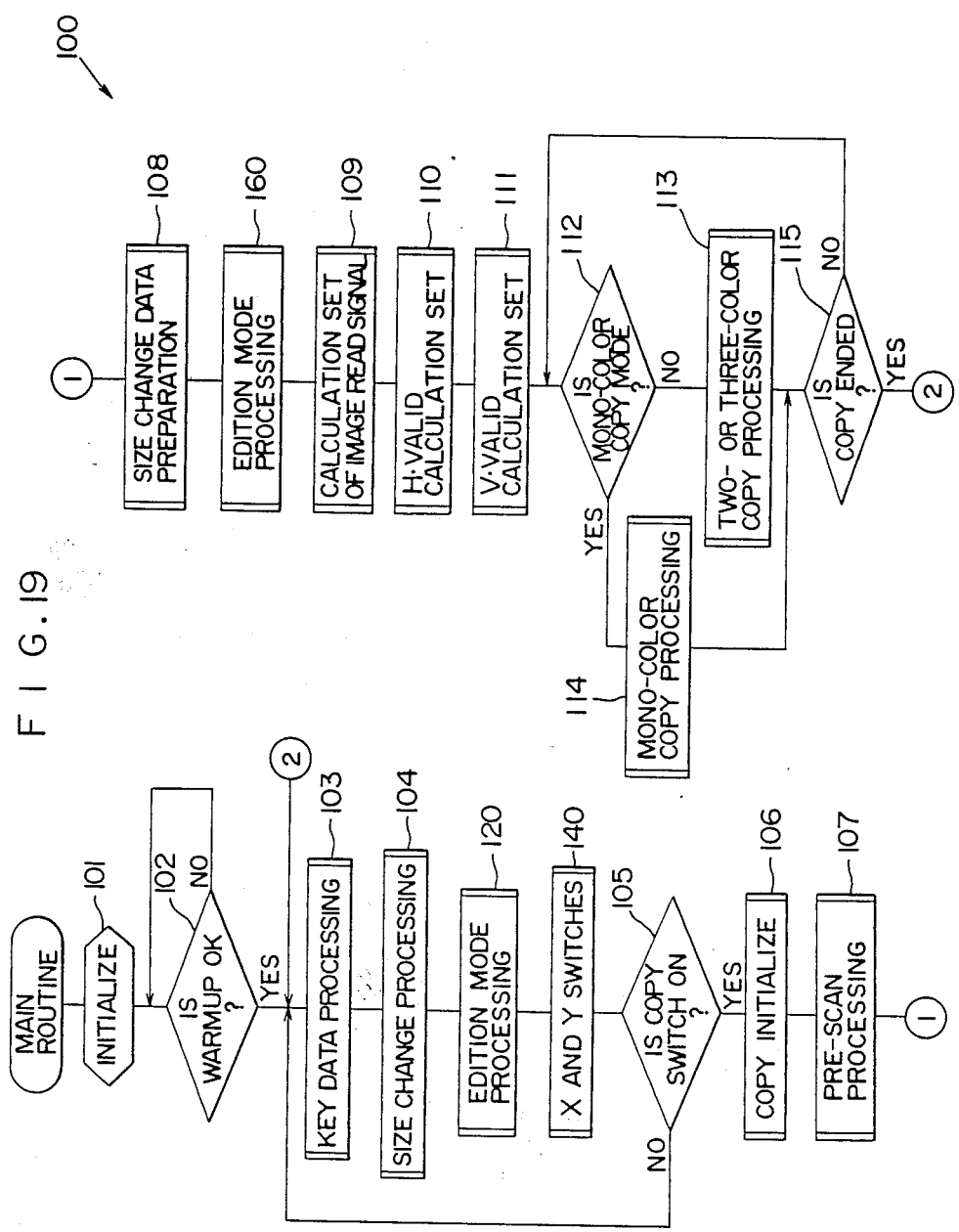
FIGS. 19 to 22 are flow charts showing one example of the control program in the edition modes.

In FIG. 19, reference numeral 100 denotes a flow chart showing one example of the control program stored in the ROM memory (although not shown) of the first microcomputer 340.

First of all, if the main power supply is made, the control program is started to transit to a mode for initializing the processing operations of the apparatus. As a result, the apparatus is initialized (at a step 101) at first. Then, warm-up is made for the fixing and lighting the light source is made. If this warm-up is completed (at a step 102), the input data processings such as the designations of the color or the copy sheet number inputted from the operation display 50 are executed (at a step 103).

After this, the size change is performed so that the designated magnification is displayed or stored (at a step 104) in the memory. When this size change is completed, the processing shifts (at a step 120) to an edition mode selection.

There are four kinds of edition modes, as has been described hereinbefore. These edition modes can be selected by the selection key 96a. The edition mode selected has its symbol mark lit and displayed.

If the edition mode 4 is selected, the input designation data from the selection keys 96b and 96c are stored (at a step 140).

After these size changes and editions, the control of the copy switch 51 is checked. If this switch 51 is depressed, the copy initialization is performed (at a step 106), and the document size is read out (at a step 107) by a pre-scanning operation.

Since the document size is read out in advance, the recording paper coincident with the document size is automatically fed.

Subsequently, the edition mode processing is performed (at a step 160) after the data processing such as the magnification when the size change is selected is executed (at a step 108).

In the edition mode processing, the magnification is calculated from the sizes of the document and the recording paper for the edition mode selected, and the drum rotation number at this time is calculated.

At a step 109, moreover, the image readout signal in the optical system is calculated in accordance with the edition mode selected. After this, in accordance with the edition mode and magnification selected, the horizontal valid area signal H-VALID and the vertical valid area signal V-VALID are calculated (at steps 110 and 111) for providing write timing signals.

After a series of these edition mode or size change processings have been completed, the copy mode is checked so that the processings corresponding to the individual designated copy modes are executed. After this, it is judged whether or not the copying operation has been completed. If YES, the processings return to the step 103 so that the aforementioned processings are executed. (at steps 112 to 115)

Here, the single-scan copying routine of the step 114 is called for the one-scan copy, and 2- or 3-scan copying routine constructed as a sub-routine is likewise called (at the step 113) for the 2- or 3-scan copy.

Figure 20:
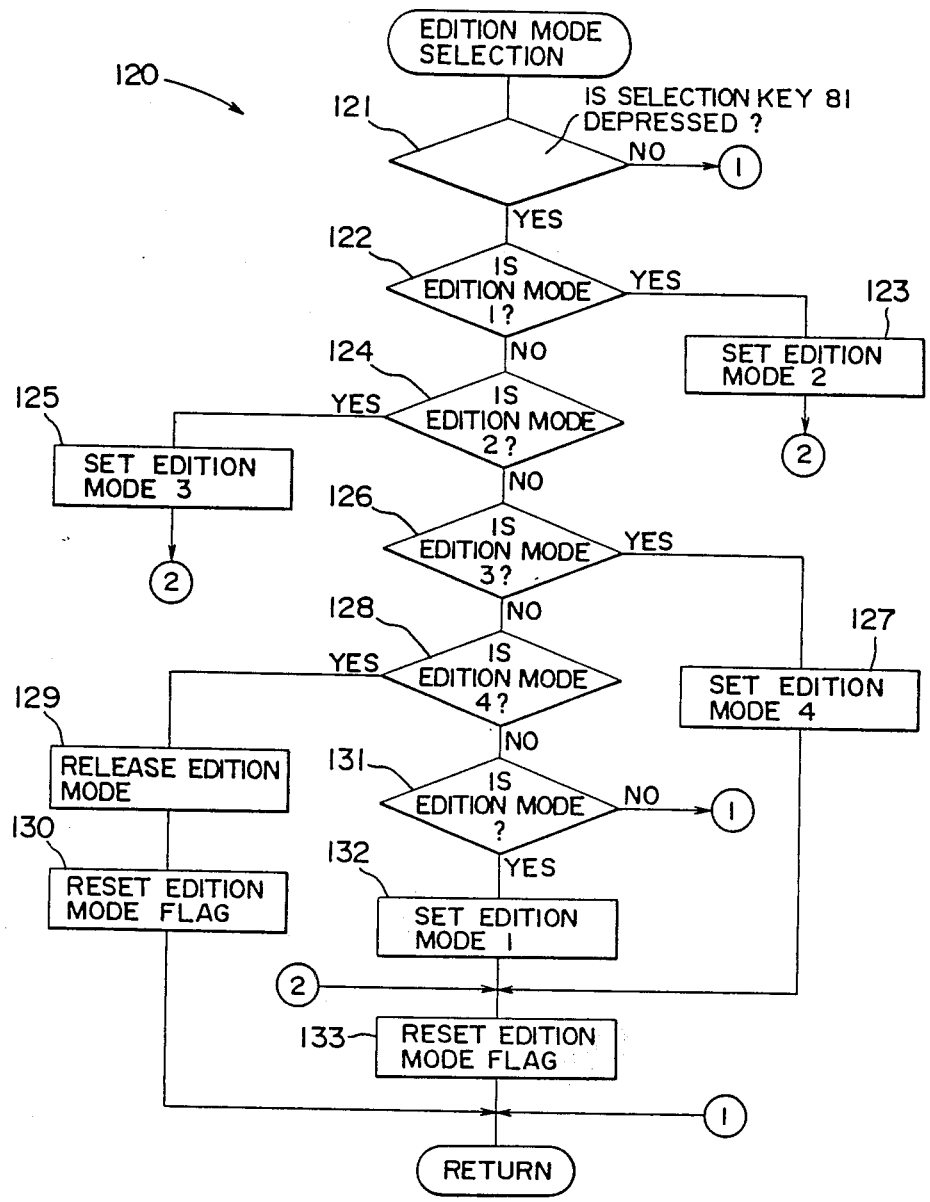

FIG. 20 shows the selection routine 120 for selecting the edition modes.

If this selection routine 120 is called, the edition modes sequentially rotate each time the selection key 96a is depressed.

If the edition modes sequentially shift from 1 to 4 so that the selection key 96a is depressed in the edition mode 4, as shown in FIG. 5, the edition mode is released.

As a result, if the selection key 96a is controlled, this control is checked at a step 121 so that the edition mode to be subsequently selected is different depending upon the edition mode immediately before the control of the selection key 96a.

As a result, the edition mode 2 is set (at steps 122 and 123) if the preceding mode is the edition mode 1.

Since the edition mode 2 is set, its flag is set, and its symbol mark 97 is lit.

Unless the preceding edition mode is 1, the aforementioned control steps are sequentially selected. If the preceding edition mode is 2, more specifically, the edition mode 3 is set. If the preceding edition mode is 3, on the other hand, the edition mode 4 is set. (at steps 124 to 127)

If the preceding edition mode is 4, the edition mode is released, and its flag is reset. (at steps 128 to 130)

Unless the preceding edition mode is 4, on the contrary. The presence of a standard mode is judged. If YES, the edition mode is set at 1, and its flag is set. (at steps 131 to 133)

Thus, in the edition mode selection routine, the edition modes are sequentially changed with the rotation shown in FIG. 15.

If the automatic magnification setting selection key 96d is controlled in case the edition mode 4 is selected, the overwrite number setting selection keys 96b and 96c validate their key inputs.

Figure 21:
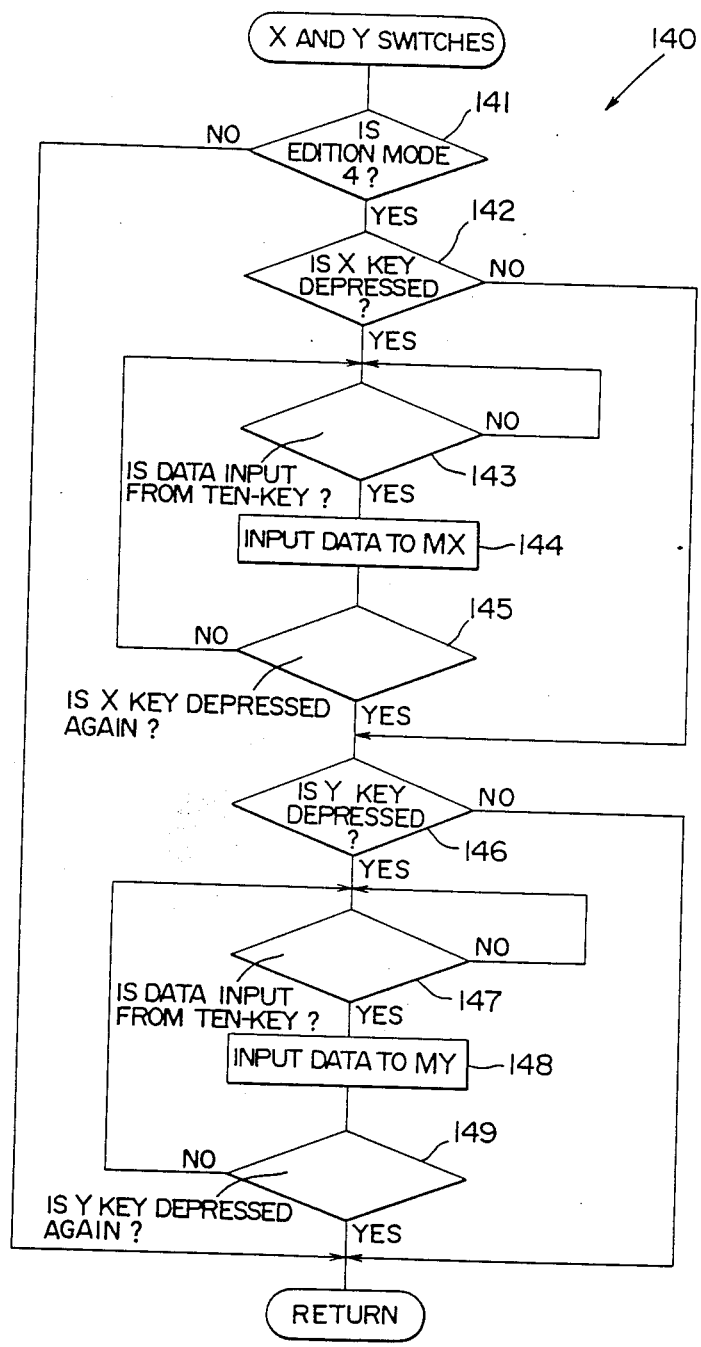

One example of the processing routine 140 therefor is shown in FIG. 21.

First of all, the selected state of the edition modes is judged (at a step 141). If the edition mode is 4, the control state of the selection key 96b is checked (at a step 142). The input of the transverse magnification, i.e., the X data is stored in the memory MX, and the control state of the selection key 96b is judged (at steps 143 to 145).

By this re-control of the selection key 96b, the X data are deemed valid and set.

Likewise, the selection key 96c is also recontrolled to store the Y data in the memory MY and set them (at steps 146 to 149).

At this time, if the automatic magnification setting selection key 96d is controlled so that the automatic magnification setting mode is selected, the input values by the selection keys 96b and 96c designate the number of the overwrites.

If the manual magnification setting mode is selected, on the contrary, each magnification is set at an interval of 1%.

If both the selection keys 82 and 83 are controlled, the processings return to the main routine (as shown in FIG. 19).

Figure 22:
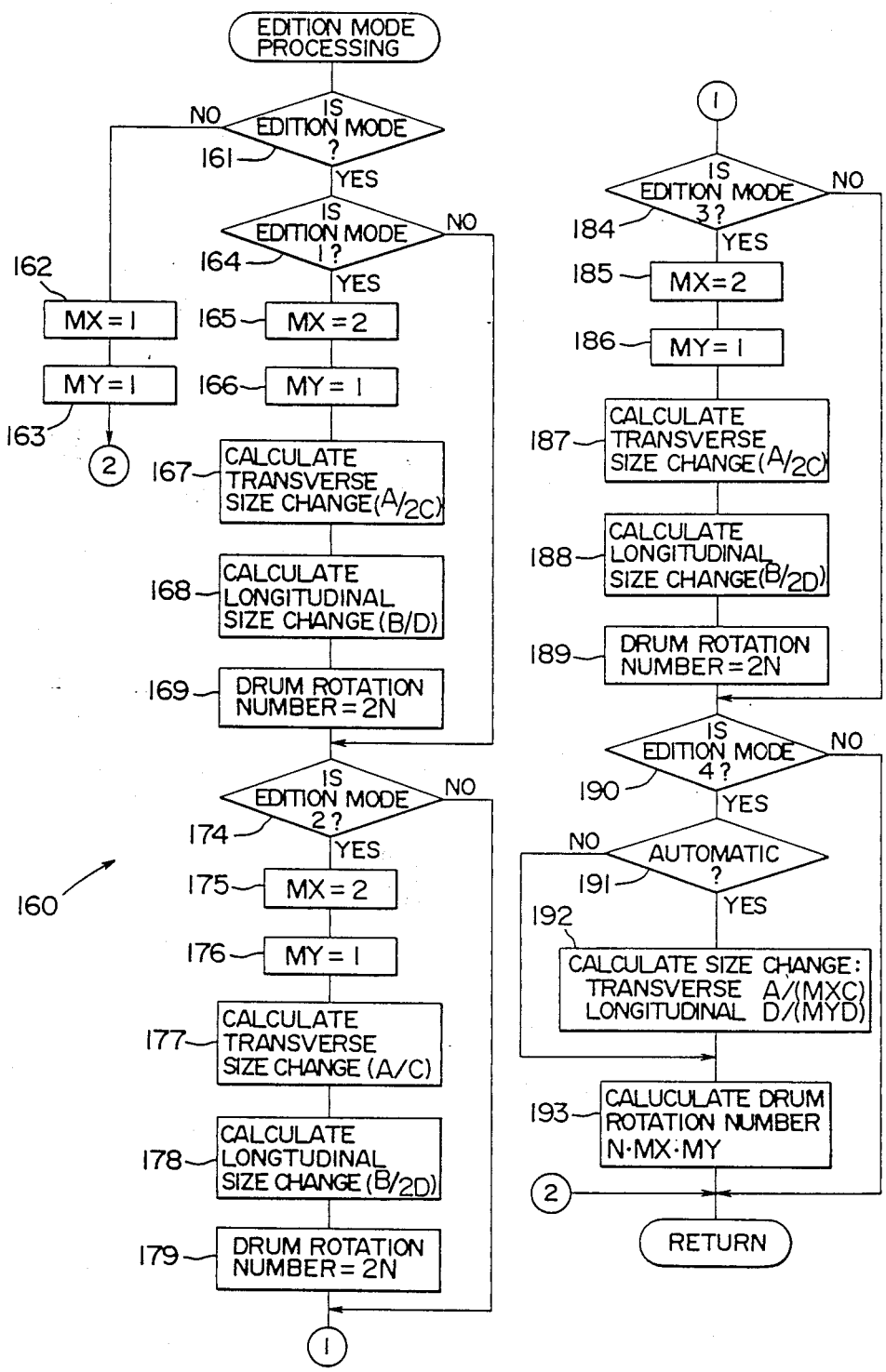

In this main processing routine 100, the edition mode processing routine 160 will be described with reference to FIG. 22.

The magnifications to be automatically set are different depending upon the edition modes. Therefore, the processing steps are provided for the edition modes 1 to 4.

In this processing routine 160, therefore, the existence of the processing mode is judged in view of its processing mode flag.

If this mode flag is in its reset state, both the X and Y magnifications are automatically set at 1 to provide an equal magnification and are then returned (at steps 162 and 163).

If the edition mode 1 is selected, its corresponding magnification is automatically set. Since the edition mode 1 is the overwrite mode in which the transverse direction is reduced to $\frac{1}{2}$, the corresponding memories MX and MY are set with 2 and 1, respectively. After this, the transverse magnification (=A/(2C)) and the longitudinal magnification (=B/D) are calculated, and the rotation number of the drum is set at 2N. (at steps 164 to 169)

After these processings have been completed, they are returned to the main processing routine 100. Even if another edition mode is selected, similar processings are conducted. Since the edition mode 2 reduces the longitudinal direction to $\frac{1}{2}$, the following variables are arithmetically processed in an automatic manner (at steps 174 to 179):

MX=1; MY=2;
Transverse Magnification =A/C;
Longitudinal Magnification =B/(2D); and
Drum Rotation Number =2N. In the edition mode 3, the individual variables are arithmetically processed in a following manner, as follows:

MX=2; MY=1;
Transverse Magnification =A/(2C);
Longitudinal Magnification B/(2D); and
Drum Rotation Number =4N. If the magnification is set in the automatic setting mode for the edition mode 4, the following arithmetic operations are conducted (at steps 191 to 193):
Transverse Magnification =A/(MXC);
Longitudinal Magnification =B/(MYD); and
Drum Rotation Number =N·MX·MY.

Now, in case such size-changeable edition mode is selected, the valid area signals H-VALID and V-VALID, i.e., the readout starting signal of the image informations of the document and the laser write control signal have to be suitably controlled in accordance with the selected edition mode.

If the edition mode 3 shown in FIG. 16D is selected, for example, the aforementioned various signals are generated, as shown in FIG. 14.

First of all, in the first write mode, as shown in FIG. 23A, the starting timing of the image readout signal of the document is similar to that of an ordinary case. And, the image write is started from the left end upper portion of the recording paper.

The laser write is accomplished while both the horizontal and vertical value area signals H-VALID and V-VALID are being obtained. As a result, in this case, the image is written and recorded in the left end upper portion of the recording paper, as shown in FIG. 23A.

Incidentally, this state is still in the developing stage.

In the second write mode, the recording image has to be shifted by $\frac{1}{2}$ in the transverse direction. For this, as shown in FIG. 23B, it is necessary to shift the image reading start by $\frac{1}{2}$C and the timing of the horizontal valid area signal H-VALID by $\frac{1}{2}$A. Thus, the images are overwritten in the transverse direction in the state shown in FIG. 23B.

Next, in the third write mode, the image record is started from the left end lower portion of the recording paper if only the vertical valid area signal V-VALID is shifted by $\frac{1}{2}$ in the mode of FIG. 23 A in the longitudinal direction. In the final write mode, moreover, the record is made, as shown in FIG. 23D, by shifting not only the image read signal but also the horizontal and vertical valid area signals H-VALID and V-VALID by $\frac{1}{2}$.

If the overwrite of FIG. 23D is completed, the transferring and fixing treatments are conducted to record the document image on the recording paper P.

If the magnification is manually set in the same edition mode, the individual signals at this time are shown in FIGS. 24A to 24D.

FIGS. 24A to 24D supposes that a document slightly larger than one quarter of the recording paper is set. In this case, it is necessary to read all the document in the first write mode. Accordingly, the image write is performed by scanning all over the recording paper.

Since, however, only the later half of the recording paper P may be recorded in the second write mode, only the image readout signal and the horizontal valid area signal are shifted by $\frac{1}{2}$. In the third write mode, on the contrary, only the vertical valid area signal is shifted by $\frac{1}{2}$. The fourth write mode is similar to that of FIGS. 23A to 23D.

Thus, the generator 200 shown in FIG. 13 is used so as to control the image readout signals, the horizontal valid area signal and the vertical valid area signal may be controlled in accordance with the edition mode to be selected.

Figure 25:
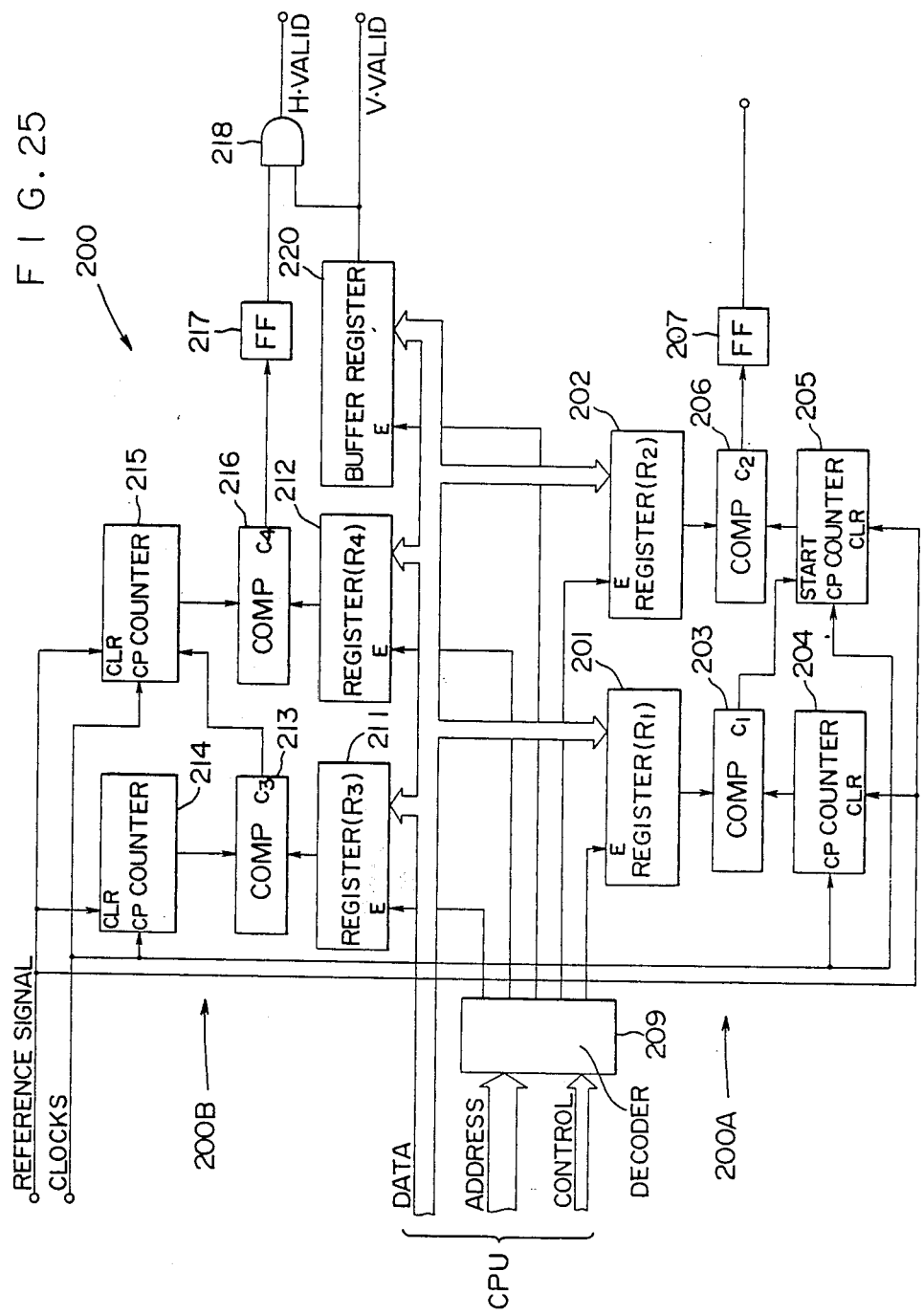
FIG. 25 is a block diagram showing a system of a generator for an effective area signal or the line.

FIG. 25 shows a specific example of that generator 200. This generator 200 is composed of a portion 200A for forming the image readout signal and a portion 200B for forming the valid area signals.

The operations of the generator 200 will be described with reference to FIGS. 26A to 26I in case the edition mode 3 is selected.

If the edition mode is selected, the magnification and drum rotation number corresponding to the edition mode selected are set so that the control signals associated with the magnification are sent out from the CPU 41 and stored in a pair of registers 201 and 202.

The first register 201 is provided for storing a signal R1 (which corresponds to a period T1 of FIG. 26B) for determining the start of reading out the image.

The second register 202 is provided for storing a signal R2 (which corresponds to a period T2 of FIG. 26C) for determining the image readout width.

It is quite natural that the values of the signals R1 and R2 are different depending upon the edition mode selected and the write mode.

What value is to be stored is instructed by the CPU 41. This CPU 41 calculates the values of the signals R1 and R2 in accordance with the edition mode.

The value of the signal R1 is compared by a comparator 203 with the counted value of a counter 204. Since this counter 204 is cleared by the reference signal (i.e., the line signal, as shown in FIG. 26A), a comparison output C1 is obtained by counting the number of the reference clocks from that reference signal to the set value R1. Thus, the image readout is started.

A counter 205 is started by the comparison output C1. This counted value is compared by a comparator 206 with the value R2 of the second register 202. Since a comparison output C2 is obtained at the start of the comparison and at the coincidence from the second comparator 206, it is received by a flip-flop 207 to form an image readout signal, as shown in FIG. 26D.

Since, in the second write mode, the image readout signal is shifted by ½ in the transverse direction, the value of the signal R1 fed from the CPU 41 is changed to the value corresponding to the period T1 of FIG. 26F. In this example, the value is shifted by about ½ in the transverse direction.

As a result, the timing at which the comparison output C1 is obtained is offset to change the image readout timing (as shown in FIGS. 26F to 26H).

In this meanwhile, a third register 211 is stored with a signal R3 corresponding to the period T1, and a fourth register 212 is stored with a signal R4 corresponding to a period T3 of FIG. 26E, i.e., from the leading end of the document to the central position of the document. As a result, a comparator 213 provides a coincidence after lapse of the period T1 so that a comparison output C3 is obtained at the leading end of the document.

When a fourth counter 216 is started by the comparison output C3 so that its counted value becomes coincident with the value R4 of the fourth register 212, a comparison output C4 is obtained from the comparator 216. This comparison output C4 is received by a flip-flop 217, a signal shown in FIG. 26E is obtained.

This signal rises at the leading end of the document and breaks at the central position of the document, and the output of an AND circuit 218 is finally used as the horizontal valid area signal H-VALID. In other words, the output is made as the horizontal valid area signal H-VALID only for the period of the vertical valid area signal V-VALID.

A fifth register 220 is a buffer register for obtaining the vertical valid area signal V-VALID. Since this vertical valid area signal V-VALID is a write control signal relating to the auxiliary scanning direction, it will provide sufficient surplus even if it is formed by a relatively low-speed processing. As a result, the vertical valid area signal V-VALID is generated in the embodiment by the arithmetic operation of the CPU 41.

Since the horizontal valid area signal H-VALID has a far higher processing rate per dot in the main scanning direction than that of the CPU 41, the aforementioned hardware is required in this case.

In the case of the second write mode, the value R3 corresponding to the period T1 is stored in the third register 211 so that the horizontal valid area signal H-VALID is formed at the timing shown in FIG. 26I.

Even in case an edition mode other than 3 is selected, similar arithmetic processings are executed so that the various signals are outputted only for a period necessary for the necessary timings, although their explanations will be omitted.

Incidentally, since the color reproducing machine thus far described is exemplified by the simplified one, the colors to be selected for the copies are limited to the three red, blue and black colors even in the multi-color mode. It will, however, be easily understood that the present invention can be applied to a color reproducing machine capable of copying other colors, a color image recording apparatus for performing developments on the basis of color separate images (e.g., complementary color separate images) different from those of the present embodiment, or an apparatus for recording images by using a medium such as an ink jet other than the laser.

In the description thus far made, moreover, the document itself is enlarged or reduced in an edition mode especially for size change. It is, however, possible to detect only the area to be copied and to overwrite it while changing its size.

In this case, the well-known image processing technique such as the masking or trimming technique may be used.

As has been described hereinbefore, according to the embodiment of the present invention, the rotation number required for developing the image retainer is calculated from the X and Y data numbers, and the image retainer is subjected to the fixing treatment. As a result, the overwritten images can be recorded by a single copying operation. More specifically, since the desired overwritten images are not formed by the several copying operations, as is different from the prior art, the editing operations such as the overwriting operations can be drastically simplified to enhance the efficiency of the editions.

Since, moreover, the overwritten images can be formed in a desired number not only in predetermined positions but also in desired arbitrary positions merely by inputting the number of the overwrites, the degree of freedom of the overwrites can accordingly be increased.

Still moreover, the present invention can enjoy a number of effects such as the shortening of the overwrite copy period, which has been unobtainable from the prior art.

In the overwriting edition mode, too, the size changing function can be attained to drastically improve the editing function.

As has been described hereinbefore, the present invention can be remarkably suited for applications to a color image recording apparatus capable of performing the predetermined color selections.

What is claimed is:

1. An image recording apparatus having a reading portion for reading an image information and converting the image information photoelectrically into an image signal and having a recording portion for writing the image information on a rotatable drum-shaped image retainer with said image signal to provide latent images, and developing the latent images, which apparatus comprises:

first timing setting means for setting a writing timing in a first writing direction with respect to said image retainer;

second timer setting means for setting a writing timing in a second writing direction with respect to said image retainer; and calculating means for calculating the number of rotations of said image retainer to be effected in accordance with the settings of the first and second writing timing setting means.

wherein said image information is overwritten on said image retainer by a number of times corresponding to said number of rotations to provide a plurality of images which may be entirely or partially or not superposed on one another.

2. An image recording apparatus according to claim 1, wherein said reading portion scans in main and auxiliary directions and wherein said first writing direction is selected in the main scanning direction of the reading portion.

3. An image recording apparatus according to claim 1, wherein said reading portion scans in main and auxiliary directions and wherein said second writing direction is selected in the auxiliary scanning direction of the reading portion.

4. An image recording apparatus having a reading portion for reading an image information and converting the image information photoelectrically into a magnifiable image signal and having a recording portion for writing the image information on a rotatable drum-shaped image retainer with said image signal to provide latent images, and developing the latent images, which apparatus comprises:

first timing setting means for setting a writing timing in a first writing direction with respect to said image retainer;

second timing setting means for setting a writing timing in a second writing direction with respect to said image retainer; and calculating means for calculating the number of rotations of said image retainer to be effected in accordance with the settings of the first and second writing timing setting means, wherein said first and second writing timings are automatically set in accordance with a designation of a magnification, and wherein said image information is overwritten on said image retainer at the designated magnification by a number of times corresponding to said number of rotations to provide a plurality of images which may be entirely or partially or not superposed on one another.

5. An image recording apparatus according to claim 4, wherein said reading portion scans in main and auxiliary directions and wherein said first writing direction is selected in the main scanning direction of the reading portion.

6. An image recording apparatus according to claim 4, wherein said reading portion scans in main and auxiliary directions and wherein said second writing direction is selected in the auxiliary scanning direction of the reading portion.

7. An image recording apparatus according to claim 4 or 5 or 6, wherein the writing magnification is automatically set by setting the number of rotations to be effected.

* * * * *